No. 770,641.

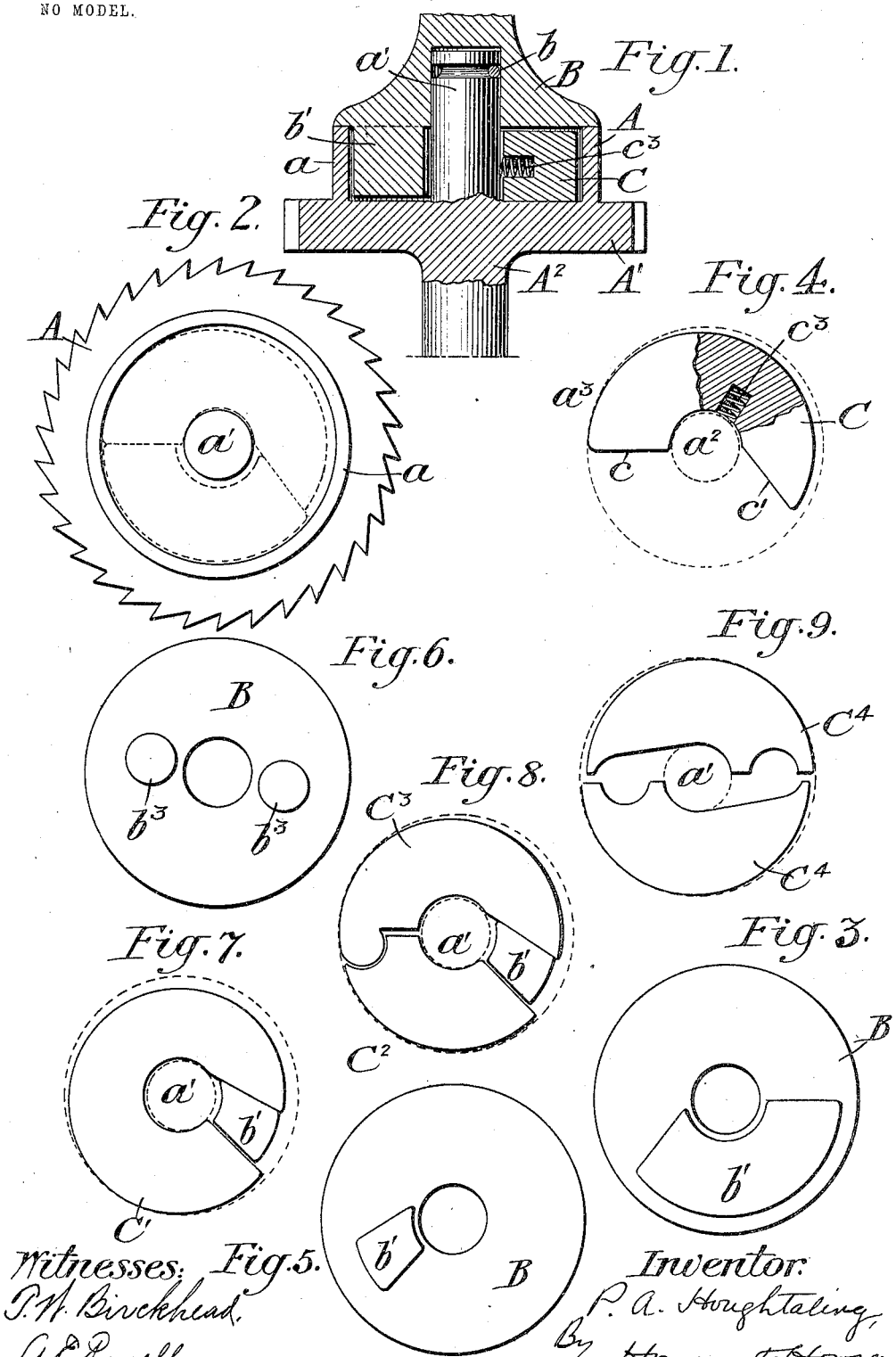

Patented September 20, 1904.

UNITED STATES PATENT OFFICE.

PAUL A. HOUGHTALING, OF RIVERTON, NEW JERSEY.

CLUTCH.

SPECIFICATION forming part of Letters Patent No. 770,641, dated September 20, 1904.

Application filed July 10, 1903. Serial No. 164,972. (No model.)

*To all whom it may concern:*

Be it known that I, PAUL A. HOUGHTALING, a citizen of the United States, residing at Riverton, Burlington county, New Jersey, have invented certain Improvements in Clutches, of which the following is a specification.

My invention relates to certain improvements in devices for connecting a driving with a driven member, and more particularly consists in an improved form of clutch which when the driving member is turned in one direction will couple it to the driven member, but will release said members from connection with each other when it is moved in the opposite direction or when a change in the relative speeds of the two members takes place.

The object of my invention is to provide a clutch which, while simple in construction and noiseless in operation, will operate with a minimum amount of lost motion when one of the members of the clutch is moved to couple it to the other. These objects I attain as hereinafter set forth, reference being had to the accompanying drawings, in which—

Figure 1 is a sectional elevation of one form of my improved clutch, showing it as applied to a car-brake shaft or spindle. Fig. 2 is a plan view of another form of the clutch with the clutching-dog and its operating part shown in dotted outline therein. Fig. 3 is an inverted plan view of the second member of the form of clutch shown in the preceding figures. Fig. 4 is a plan view of the clutch-dog with that member of the clutch upon which it acts indicated by dotted lines. Figs. 5 and 6 are inverted views of special forms of the second member of my improved clutch. Figs. 7 and 8 are plan views illustrating various forms of dogs designed to be used with a clutch member of the form shown in Fig. 5, and Fig. 9 is a plan view of a pair of dogs designed to be used with the clutch member shown in Fig. 6.

In the above-noted drawings, A and B represent, respectively, the two clutch members, there being in the present instance a ratchet-wheel A' attached to or formed integral with the member A, which also has an annular casing $a$, in which is contained the clutch-dog C. This ratchet-wheel A' is designed to be used in connection with a pawl in the manner commonly found on car-brakes and has a downwardly-extending brake staff or rod $A^2$ and an upwardly-extending central stem or stud $a'$. The second member of the clutch B in the present instance is shaped as a cover for the casing $a$, fitting over it, as shown, and held in position by means of a pin $b$ extending into an annular recess formed in the upwardly-projecting stem $a'$.

On the under face of the member B and projecting into the casing $a$ is a block $b'$, which, as shown in the figures, is in the shape of a segment of a ring. The remainder of the interior of the casing $a$ is occupied by the dog C, and this is so constructed that while both of its ends are practically in contact with the adjacent ends of the block $b'$ of the section B one of said ends, as $c$, may be, as shown in Fig. 2, of a width completely filling the space between the wall of the casing $a$ and the upwardly-projecting stem $a'$. From this end the dog tapers in width to its end $c'$, which, as in Fig. 4, is of less width than the above-mentioned space between the wall of the casing $a$ and the stem $a'$.

In some cases I form a recess in the inner face of the dog C and in this recess place a small spiral spring $c^3$ of a length sufficient to bear upon the stem $a'$, and thereby press outwardly the narrow end of the dog.

In operation as long as the member B is turned so that its projecting block $b'$ bears against the end $c$ of the dog C this latter will be merely pushed around within the casing $a$ without having any tendency to clutch to the same or move it. The reason for this lies in the fact that there is no possibility of acting upon this end $c$ of the dog by means of the block $b'$ to cause it to move otherwise than around within the casing, since this end practically fills the space between the wall of said casing and the central spindle or projection $a'$. On the other hand, when the member B is turned so that the block $b'$ presses against the end $c'$ of the dog C the first result of said pressure is to move or tend to move said end away from the axis of the clutch, and this immediately results in the end $c$ of the dog gripping the member A of the clutch at two points, (indicated at $a^2$ and $a^3$ in Fig. 4,) thereby immediately coupling the two members of the clutch together. Said two members are instantly released upon the pressure being removed from the end $c'$ of the dog C. The action of the block $b'$ upon the dog C is accentuated if the end $c'$ of the dog and the coacting end of the block are shaped as shown in Figs. 3 and 4, so as to have a wedge-like effect, and although this is not absolutely essential to the proper operation of the clutch such formation is preferred. The office of the spring $c^3$ is to hold the narrow end of the dog out toward the wall of the casing $e$, so that said dog will grip the second member of the clutch immediately pressure is brought to bear upon the end $c'$.

In that embodiment of my invention shown in Figs. 5 and 7 the block $b'$ is shortened and the dog C' is correspondingly lengthened.

If desired, the dog may be made in two parts, as shown in Fig. 8, one of these, as $C^2$, filling the space between the central stem $a'$ and the wall of the casing and the other, $C^3$, being made tapering from end to end and having its larger end formed to engage the correspondingly-recessed end of the part $C^2$. In operation the movement of the part $C^3$ in gripping the wall of the casing and the spindle $a'$ causes the part $C^2$ to be also moved, so that it acts similarly to grip the casing.

From the above it will be understood that, if desired, more than one dog may be employed, together with means for holding said dog in a position so that pressure upon its narrow end will instantly cause it to grip the other member of the clutch.

Another form of the device is shown in Fig. 9, in which a plurality of dogs $C^4$ are employed, one end of each of these, as before, being so made as to completely fill the space between the wall of the casing and the central projecting stem, while the other is of a width less than said distance between the stem and the wall of the casing. In such case there are a plurality of projections $b^3$ on the member B, these fitting, if desired, suitable recesses formed, as shown in Fig. 9, in the ends of the dogs $C^4$, the walls of the recesses in the narrow ends of the dogs being preferably beveled to cause wedge action of the circular blocks.

While I have shown my improved device employed in connection with car-brake, I do not confine myself to such use, as it may be employed to connect any desired driving mechanism with any mechanism designed to be driven thereby.

While in the drawings and in the above description I have referred to the member B as possessing one or more projecting blocks which are designed to coact with and operate the dogs, it will be understood that projections may be made on said dogs of such a form as to enter a suitable recess or recesses in the member B, such construction not being shown in view of the fact that in such a form of the connection it is immaterial which part of the clutch carries the projection and which has the recess therefor.

I claim as my invention—

1. The combination in a clutch of two members of which one has a flange and a central projection together forming an annular recess, a lever loosely mounted in said recess having one end less in width than the width of the recess and the other end radial and of substantially the same width as said recess, a connection between the other member of the clutch and the lever so arranged that when it is desired to couple the members, the lever is caused to fulcrum upon the flange of the casing and bite upon the central projection, substantially as described.

2. A clutch having two members of which one has a bearing-surface, a dog placed to coact with said surface and having a portion free to move radially, said portion having an end inclined to a radial line of the clutch and one of the clutch members having an inclined surface formed to engage said inclined surface of the dog with a wedge-like action, whereby a portion of the dog is moved radially and the dog caused to grip the bearing-surface to couple the clutch members together, substantially as described.

3. The combination in a clutch of a member having an interior and an exterior bearing-surface, a lever free to move between the two surfaces having one end less in width than the distance between said surfaces and its other end made radial to the surfaces and substantially the same width as the distance between them, with means for throwing one end of the lever outwardly to cause it to fulcrum on the outer surface and engage with the inner surface, substantially as described.

4. The combination in a clutch having two members of which one includes a casing and the other is provided with a portion extending into said casing, of a dog substantially filling the space within the casing at one portion thereof and partly filling it at another portion, said dog being engaged by the extended portion of the second clutch member, with means in addition to the said extended portion of the clutch member tending to force the narrow portion of the dog outwardly, substantially as described.

5. The combination in a clutch of two members, one of the same including a casing having a central bearing portion so disposed as to form an annular recess, a lever within the recess serving as a dog and having one end less in width than said recess and the other end radial and substantially the same width as the recess, with a projection from the second member of the clutch engaging the dog so as to force the small end outwardly and cause its other end to engage the casing and clutch the second member thereto, substantially as described.

6. The combination of a casing having within it a central recess, a stem concentrically placed within said recess and forming with the casing one member of the clutch, a dog within the space between the wall of the casing and the central stem, said dog being tapered toward one end, with a connection between the second member of the clutch and the dog, said dog having a recess in its inner face and being provided with a spring in said recess placed so as to bear upon the central portion of the first clutch member, substantially as described.

7. The combination in a clutch having two members of which one includes a casing having inner and outer bearing portions, of a dog connected to the second clutch member and substantially filling the space within the casing at one portion thereof, said dog partially filling said space at another portion and having its large end radial to the bearing-surfaces whereby outward motion of its smaller part tends to cause it to fulcrum on the outer portion of the casing to couple the clutch members, substantially as described.

8. The combination in a clutch of a casing having within it a bearing-surface, a central spindle concentric with said surface, an elongated dog within the casing, a second member to the clutch connected to one end of the dog, said end being less in width than the space between the spindle and said bearing-surface and the other end being of substantially the same width as said space and radial to the central spindle, substantially as described.

In testimony whereof I have signed my name to this specification in the presence of two subscribing witnesses.

PAUL A. HOUGHTALING.

Witnesses:
WILLIAM E. BRADLEY,
JOS. H. KLEIN.